Figure 1:
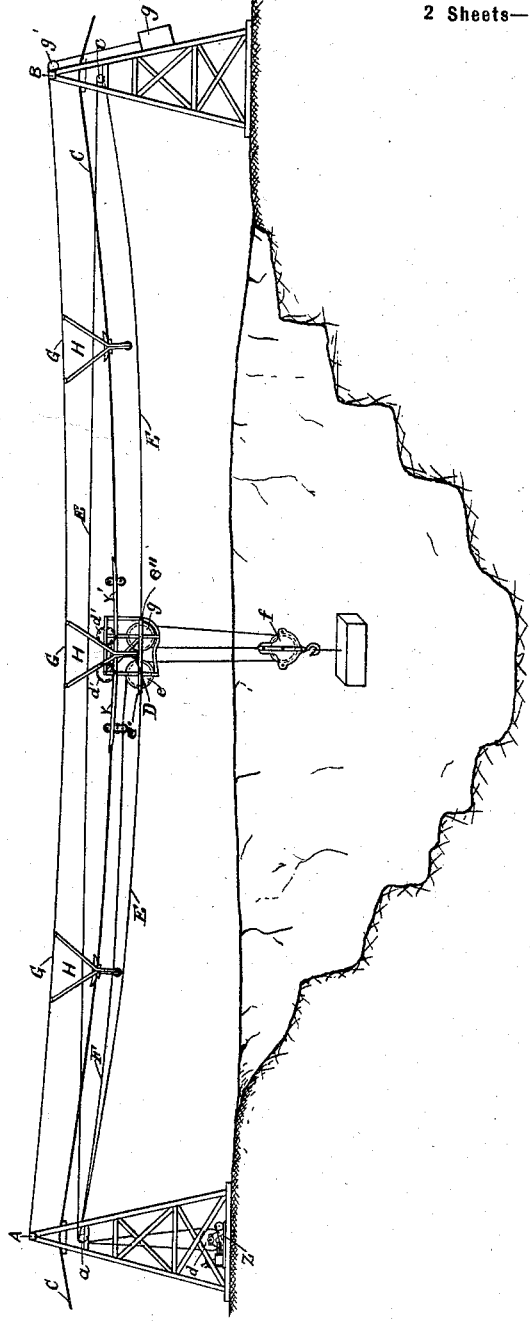

No. 609,961. Patented Aug. 30, 1898.
A. H. DE CAMP, Dec'd.
E. A. & C. A. DE CAMP, Executors.
HOISTING AND CONVEYING APPARATUS.
(Application filed Jan. 24, 1898.)

(No Model.) 2 Sheets—Sheet 1.

WITNESSES:

ATTORNEY

No. 609,961.
A. H. DE CAMP, Dec'd.
E. A. & C. A. DE CAMP, Executors.
HOISTING AND CONVEYING APPARATUS.
(Application filed Jan. 24, 1898.)
Patented Aug. 30, 1898.
(No Model.)
2 Sheets—Sheet 2.
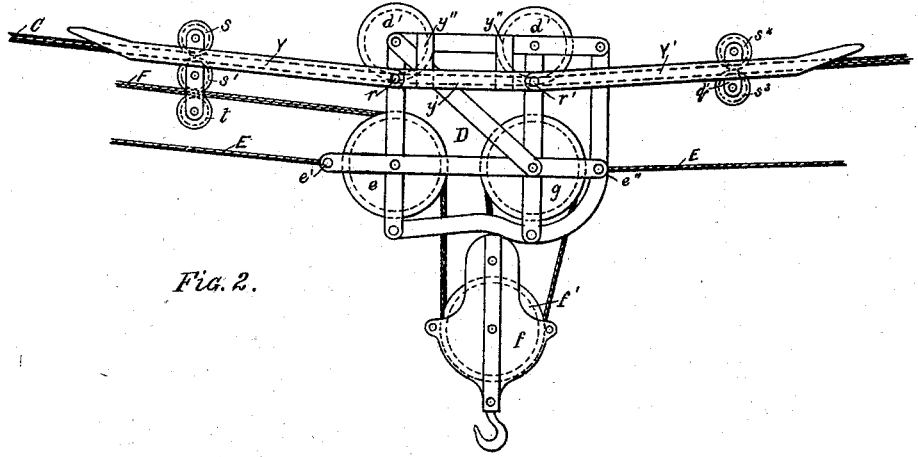
Fig. 2.
Fig. 3.
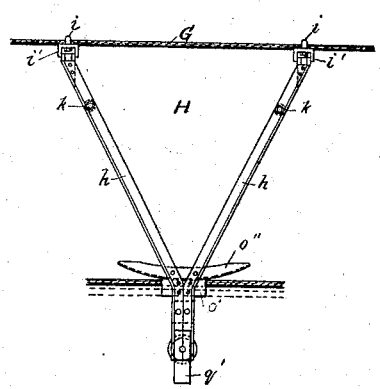
Fig. 4.
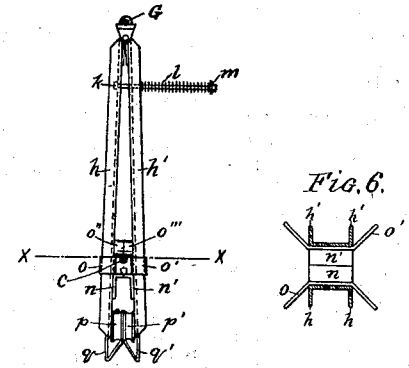
Fig. 5.
Fig. 6.
WITNESSES:
B Thompson.
W Halk Apgar
Estelle Austin De Camp
Clara A. De Camp
Executors
BY
Francis C. Lowthorpe
ATTORNEY

UNITED STATES PATENT OFFICE.

ESTELLE AUSTIN DE CAMP AND CLARENCE A. DE CAMP, OF BOONTON, NEW JERSEY, EXECUTORS OF ALFRED H. DE CAMP, DECEASED.

HOISTING AND CONVEYING APPARATUS.

SPECIFICATION forming part of Letters Patent No. 609,961, dated August 30, 1898.

Application filed January 24, 1898. Serial No. 667,708. (No model.)

*To all whom it may concern:*

Be it known that ALFRED H. DE CAMP, lately a citizen of the United States, residing at Boonton, in the county of Mercer and State of New Jersey, deceased, in his lifetime invented certain new and useful Improvements in Hoisting and Conveying Apparatuses, of which the following is a specification.

The invention herein specified is a modification of certain improvements in hoisting and conveying apparatuses which are the subject of Letters Patent of the United States, bearing date of the 28th day of January, 1896, numbered 553,778, for hoisting and conveying machines, and issued to the Trenton Iron Company, of Trenton, New Jersey, as assign, and relates to that class of hoisting and conveying apparatuses in which a carriage traverses an elevated way and means are provided for moving said carriage on said way and in which, in connection with said carriage, there is operated a hoisting or fall rope for raising and lowering loads to and from the carriage to be transported thereby; and the objects of said invention are to provide simple and efficient supports for sustaining the fall-rope at a point or points between the carriage and the end of the conveying apparatus from which said fall-rope is operated and to provide means for sustaining said fall-rope supports and means for removing said supports temporarily from the path of the carriage as the carriage passes them.

In illustrating said invention it is shown in connection with a hoisting and conveying apparatus of the kind usually known as "cable hoists," in which the carriage traverses a tram-cable, and in the accompanying drawings, forming a part of this specification, Figure 1 is a side elevation of such a hoisting and conveying apparatus embodying said invention. Fig. 2 is a side view of the carriage of the apparatus, said carriage being provided with a deflecting frame constructed according to testator's said invention. Fig. 3 is a top or plan view of the carriage and its deflecting frame shown in Fig. 2. Fig. 4 is a side elevation of one of the fall-rope supports. Fig. 5 is an end elevation of said support; and Fig. 6 is a detailed view of a part of one of said fall-rope supports, taken in horizontal section on the line $x\ x$ in Fig. 5, looking from above.

In the drawings, A B are terminal supports of the apparatus.

C is the tram-cable, upon which the carriage of the apparatus travels, said tram-cable being passed over the said terminal supports and firmly anchored at its ends in the usual way, said anchorages being not shown.

D is the carriage, which is of ordinary construction and adapted to traverse said tram-cable, being provided for that purpose with the grooved wheels $d'\ d'$ and also having at the lower parts of its frame the sheaves $e\ g$, upon which runs the fall-rope.

E is the hauling-rope, one end of which is secured to the frame of the carriage at the point $e'$ and passes thence over a sheave $a$, mounted in the support A, and thence to and around a drum $d$, operated by the engine Z, and thence to and over a sheave similar to the sheave $a$ and mounted on the same shaft and to and around the sheave $c$ in the support B, and thence to the carriage D, to the frame of which it is attached at the point $e''$.

F is the hoisting or fall rope, one end of which is wound on a drum operated by the engine Z, said drum being mounted upon the same shaft of the engine as is drum $d$ and being not shown in the drawings, and passing thence to and over a sheave similar to the sheave $a$ and mounted on the same shaft therewith in the support A, and thence between the sheaves $s'\ t$, mounted in the deflecting frame Y, attached to the carriage D, and thence to and over the sheave $e$, mounted in the frame of the carriage, and thence around the sheave $f'$ in the fall-block $f$, and thence around the sheave $g$, mounted in the carriage-frame, and thence to the fall-block $f$, to which it is attached in the usual way.

G is a supporting and guide rope for the fall-rope supports, and is secured at one end to the top of the terminal support A at a point above the tram-cable C and in a vertical plane therewith and passes thence to and over the sheave $g'$, mounted at the top of the terminal support B, and thence down to a weight $g''$, to which it is securely attached.

H H are fall-rope supports which are securely attached to the supporting guide-rope G by means of the U-bolts $i\ i$. Each of these supports consists of duplicate frames connected together at their tops by the hinges $i'\ i'$, which hinges engage with the U-bolts $i\ i$, thereby connecting the frames of the fall-rope supports to the rope G. Each of said duplicate frames of these supports consists of two bars $h\ h$ and $h'\ h'$, which are rigidly secured together at their lower ends and flare outwardly from each other toward their upper portions. (See Fig. 4.) The headed bolts $k\ k$ pass through openings formed in the several members of the two frames $h\ h$ and $h'\ h'$ and are provided at their outer ends with adjustable nuts $m\ m$. Each of these bolts is also provided with a compression-spring $l$ upon the part of the bolt projecting through the frame, which springs serve to keep the two frames of the support normally close together at their lower ends. (See Fig. 5.) Toward the lower ends of each of the frames $h\ h$ and $h'\ h'$ are mounted the inwardly-projecting angle-pieces $n\ n'$. These pieces are rigidly secured to their respective frames, and when in normal position contact with each other, as shown in Fig. 5. Above the pieces $n\ n'$ on the inner faces of the frames $h\ h'$ are secured the doubly-flaring guide-pieces $o\ o'$, and above the guide-pieces $o\ o'$ on the inner faces of each of the frames $h\ h$ and $h'\ h'$ are firmly secured the guides or rests $o''\ o'''$. These guides $o''$ and $o'''$ have inwardly-projecting parts, which contact throughout their whole length when the frames are in their normal positions, and they are curved upwardly at both ends. (See Fig. 4.) Near the lower ends of each of the said frames are revolubly mounted the supporting-sheaves $p\ p'$, and at the lower ends of each of the frames $h\ h$ and $h'\ h'$ are secured the bent guide-pieces $q\ q'$.

To the frame of the carriage are pivotally secured at each end the flaring guides Y Y'. These guides serve as deflectors, and each is composed of two pieces of metal so bent as to bring their ends at one side to a common point, where they are rigidly united. These pointed ends travel directly above the tram-cable or trackway, and their respective sides flare outwardly from each other, so as to embrace the tram-cable C, and their lower edges are depressed slightly below the level of the under side of the tram-cable. Continuing toward the points of their attachment to the carriage-frame proper they still further diverge, as shown in Fig. 3, and at their ends are pivotally connected to the bars $y\ y'$ by the countersunk bolts or rivets $r\ r\ r'\ r'$. The bars $y\ y'$ are secured to the carriage-frame by the brackets $y''\ y''$, said brackets being so formed as to space the bars $y'\ y'$ a sufficient distance from the frame of the carriage for clearance, as hereinafter explained.

The frame Y' is provided toward its pointed end with the brackets $q''\ q''$. These brackets are securely fastened upon the inner faces of the parts of the frame Y', and between them and connected to them are axles, on which are mounted the rollers $s^2\ s^3$, the former above the tram-cable and the latter below it. Similarly on frames Y are secured the brackets $q'''\ q'''$, supporting the rollers $s\ s'$, embracing above and below the tram-cable C, and also supporting the roller $t$, over which passes the fall-rope F.

It will be observed that the tension on the supporting guide-rope G may be regulated by increasing or diminishing the weight $g''$, so that the fall-rope supports H may be sustained entirely by said supporting guide-rope G, or, as in practice is preferable, the tension upon the rope G may be such as to maintain the rope-supports H in an upright position, while permitting them to receive their principal support from the tram-cable C. As will be seen, provision is made to maintain the said fall-rope supports in their proper positions relatively to the tram-cable C whether they be principally supported thereby or by the rope G.

The operation of the apparatus is as follows: To move the carriage out upon the line of the apparatus to receive its load, the engine is started up and the drums are so revolved as to draw and pay out, respectively, the hauling-rope and the fall-rope at the same rate of speed in the common manner. As the carriage approaches one of the fall-rope supports H the pointed end of the frame Y' enters the fall-rope support H between its frames $h$ and $h'$. If the support be sustained entirely by the rope G, the approaching carriage will depress the tram-cable into the position within the fall-rope support shown by the dotted circle in Fig. 5, and when the pointed end of the frame Y' enters said support it impinges against the flaring guides $o\ o'$ and bears upon the upper faces of the angle-pieces $n\ n'$, and as the carriage progresses the two frames $h\ h'$ are separated to the entire width of the deflecting-frame, being held close against said frame by the springs $l$ on the bolts $k$. When the frame Y of the carriage reaches the flaring guides, the springs $l$ operate to close the frames $h\ h'$ toward each other until the frame Y has entirely passed them, when they are closed together in the manner shown in Fig. 5, so that the tram-cable C is embraced within the space between the said two frames and the parts $o''\ o'''$ and $n\ n'$, while the fall-rope runs upon one of the sheaves $p\ p'$ at the lower end of the fall-rope support and is sustained thereby, and this operation is repeated each time the carriage passes through the fall-rope support in its passage. The same operation is performed upon the return of the carriage, excepting, of course, that the fall-rope is not sustained by any fall-rope support through which the carriage has passed on its return toward the operating-engine. If, on the other hand, the fall-rope supports are sustained principally by the tram-cable C and the rope G is used principally as a guide-rope to maintain the supports in an upright position, the pieces $o''$ $o'''$ rest directly upon the tram-cable in the manner shown in Fig. 5, and when the carriage approaches the support, its weight being not sufficient to depress the tram-cable enough to cause the fall-rope support to rise relatively to it, the pointed end of the frame $Y'$ first contacts with the pieces $o''$ $o'''$ and, passing under them, lifts the fall-rope support bodily from the tram-cable, while the flaring portions of the frames $Y'$ impinge against the flaring pieces $o$ $o'$ and press the frames $h$ $h'$ apart to permit of its passage between them, as described above; but the deflecting frame of the carriage does not in this case bear down upon the parts $n$ $n'$ as the weight of the fall-rope support is thrown upon the deflecting frame of the carriage and the parts $o''$ $o'''$ slide along upon the upper sides of the frames $Y'$ $Y'$, $y'$ $y'$, and $Y$ $Y$, the springs $l$ serving to close the frames $h$ $h'$ together, as above described, and to cause them to embrace the tram-cable between them and the parts $o''$ $o'''$ and $n$ $n'$ when the carriage has passed. The bent guides $q$ $q'$ are provided for the purpose of assisting in restoring the fall-rope $E$ to its proper position upon one of the pulleys $p$ $p'$ in the event of its having failed to rise to its proper position in the support at the time the carriage has passed outwardly upon the line. If provision were not made for assisting to restore the fall-rope to its proper position in the fall-rope support upon the return of the carriage, it might in rising contact with the under side of one of the sheaves $p$ $p'$ and so block the progress of the carriage and cause kinking of the rope. By means of the device just described such difficulties are successfully obviated.

As will be readily understood, the object in providing a flexible deflectable frame for the carriage and placing at its forward and rearward ends sheaves which embrace the tram-cable is to overcome any uncertainty of the movement of the frame due to the changing deflection of the tram-cable, caused by the varying weights of the carriage and its loads, as by holding the pointed ends of the frame always in the same relative positions to those parts of the tram-cable over which they are passing there is provided a certain contact between the pointed ends of the frame and the guides on the fall-rope supports.

As it is contemplated to employ the above-described improvements in connection with hoisting and conveying apparatuses having rigid ways upon which the carriage of the apparatus may move, it is not, therefore, intended to be confined to the specific form of apparatus shown; but,

Having thus described the invention, what is claimed is—

1. In a hoisting and conveying apparatus, a way, a carriage movable upon said way, said carriage having a flexible deflecting frame with elevated pointed ends, the outer end portions of said frame being supported upon guiding-sheaves running on the way of the apparatus, and the inner ends of said portions of said frame being hinged to the ends of the middle portion thereof, and a fall-rope passing over a sheave on said carriage, in combination with a cable sustained above said way practically parallel in a vertical plane therewith, a fall-rope support depending from said cable and embracing said way, said fall-rope support comprising duplicate frames, and guides mounted on the inner faces of said frames to bear upon the deflecting frame of said carriage as it passes.

2. In a hoisting and conveying apparatus, a tram-cable, a carriage adapted to travel thereon, said carriage having a flexible deflecting frame with pointed elevated ends, the outer end portions of said frame being supported upon guiding-sheaves running on the way of the apparatus, and the inner ends of said portions of said frame being hinged to the ends of the middle portion thereof, guide-sheaves on said frame to embrace the tram-cable, and a fall-rope passing over a sheave on said carriage, in combination with a cable supported above said tram-cable and practically parallel therewith in a vertical plane, a weight attached at one end of said cable for producing tension thereon, a fall-rope support connected with said cable and embracing the said tram-cable, said fall-rope support comprising duplicate frames, a guide-piece on the inner faces of said duplicate frames for embracing the tram-cable and bearing upon the duplicate frame of said carriage when it passes, and means for closing and holding said frames together at their lower ends when in normal position.

3. In a hoisting and conveying apparatus, a way, a carriage adapted to traverse said way, means for moving said carriage on said way, a flexible deflecting frame fixed on said carriage, said frame having pointed ends and flaring sides, sheaves on the outer ends of said frame for guiding said frame on said way, the end portions of said frame being hinged to the middle portions thereof, and a fall-rope passing over a sheave on said carriage, in combination with a cable sustained above said way practically parallel thereto in a vertical plane therewith, a fall-rope support connected with said cable, said fall-rope support comprising duplicate frames embracing said way, and vertically-curved supporting-guides attached to the inner faces of said duplicate frames for supporting said frames on said way and contacting with the deflecting frame of said carriage.

4. In a hoisting and conveying apparatus, a fall-rope support comprising duplicate frames, each of said frames having at its lower end a sheave for sustaining the fall-rope of the apparatus, and a guide for directing the fall-rope past said sheaves when it is raised.

5. In a hoisting and conveying apparatus comprising a fall-rope support, a carriage adapted to travel on the way of said apparatus, said carriage having a flexible deflecting frame, said frame consisting of a middle portion and two end portions hinged together so as to permit of vertical deflection of the frame, said frame having pointed elevated ends and flaring sides, and means on said frame for retaining the pointed ends thereof in a fixed relation to said way.

ESTELLE AUSTIN DE CAMP,
    CLARENCE A. DE CAMP,
*Executors of the estate of Alfred H. De Camp, deceased.*

Witnesses:
 MARY A. DE CAMP,
 ANNA F. JONES.